(12) United States Patent
Parsoneault et al.

(10) Patent No.: US 8,913,344 B1
(45) Date of Patent: Dec. 16, 2014

(54) DYNAMICALLY ADJUSTABLE FLUID DYNAMIC BEARING STIFFNESS

(71) Applicant: Seagate Technology LLC, Cupertino, CA (US)

(72) Inventors: Norbert Steven Parsoneault, Boulder, CO (US); Hans Leuthold, Santa Cruz, CA (US); Paco Gregor Flores, Felton, CA (US); Timothy Edward Langlais, Minneapolis, MN (US); Matthew M. McConnell, Scotts Valley, CA (US); Chris M. Woldemar, Santa Cruz, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/063,859

(22) Filed: Oct. 25, 2013

(51) Int. Cl.
  *G11B 17/02* (2006.01)
(52) U.S. Cl.
  USPC ....................................... 360/99.08

(58) Field of Classification Search
  USPC ........................................................ 360/99.08
  See application file for complete search history.

(56) References Cited

U.S. PATENT DOCUMENTS

| | | | |
|---|---|---|---|
| 5,448,120 A * | 9/1995 | Schaule et al. | 310/90 |
| 6,069,768 A * | 5/2000 | Heine et al. | 360/99.08 |
| 6,292,328 B1 * | 9/2001 | Rahman et al. | 360/99.08 |
| 6,664,687 B2 | 12/2003 | Ichiyama | |
| 8,189,291 B2 * | 5/2012 | Ku et al. | 360/99.08 |
| 8,315,011 B2 | 11/2012 | Nishitani | |

FOREIGN PATENT DOCUMENTS

| | | |
|---|---|---|
| EP | 0536267 | 2/1991 |
| EP | 0412674 | 9/1998 |

* cited by examiner

*Primary Examiner* — Mark Blouin (57) ABSTRACT

An apparatus includes a fluid dynamic bearing and means for dynamically adjusting the stiffness or damping of the fluid dynamic bearing.

36 Claims, 8 Drawing Sheets

DYNAMICALLY ADJUSTABLE FLUID DYNAMIC BEARING STIFFNESS

BACKGROUND

An electric motor may use stators, magnets, and/or coils to rotate an object. For example, a motor may rotate data storage disks used in a disk drive storage device. The data storage disks may be rotated at high speeds during operation using the stators, magnets, and/or coils. For example, magnets and coils may interact with a stator to cause rotation of the disks relative to the stator.

In some cases, electric motors utilize a spindle motor with a fluid dynamic bearing to support the hub and disks for rotation. The fluid dynamic bearing reduces friction while maintaining the alignment between the spindle and the shaft during operation of the motor.

SUMMARY

An apparatus includes a fluid dynamic bearing and means for dynamically adjusting the stiffness or damping of the fluid dynamic bearing.

These and other aspects and features of embodiments may be better understood with reference to the following drawings, description, and appended claims.

BRIEF DESCRIPTION OF DRAWINGS

The present invention is illustrated by way of example, and not by way of limitation, in the figures of the accompanying drawings and in which like reference numerals refer to similar elements.

DETAILED DESCRIPTION

Before various embodiments are described in greater detail, it should be understood that the embodiments are not limited to the particular embodiments described and/or illustrated herein, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Disks of a hard disk drive ("HDD"), such as that of FIG. 7 described herein below, may be rotated at high speeds by means of an electric motor including a spindle assembly mounted on a base of a housing. Such electric motors include a stator assembly including a number of stator teeth, each extending from a yoke. Each stator tooth of the number of stator teeth supports a field coil that may be energized to polarize the field coil. Such electric motors further include one or more permanent magnets disposed adjacent to the number of stator teeth. As the number of field coils disposed on the number of stator teeth are energized in alternating polarity, the magnetic attraction or repulsion of a field coil to an adjacent permanent magnet causes the spindle, including a hub, of the spindle motor assembly to rotate, thereby rotating the disks for read/write operations by one or more read-write heads.

A fluid dynamic bearing is formed by adding a fluid to allow the spindle of the spindle motor assembly to rotate with reduced friction. A fluid dynamic bearing may include two components: a thrust portion and a radial portion. The thrust portion controls the axial motion and may also contribute to angular stiffness control. The radial portion controls the side-to-side radial motion and angular stiffness.

In order to conserve power, some motors may sacrifice stiffness. However by sacrificing stiffness, the number of conditions likely to damage the motor may increase. For example, when the motor is dropped or twisted from side to side, the fluid dynamic bearing may be damaged and the heads may crash into the disks. During extreme conditions, some motors and/or hard disk drives may shutdown and park the heads for protection.

On the other hand and according to embodiments described herein, various embodiments are configured to detect environmental conditions and dynamically adjust the stiffness or damping of a fluid dynamic bearing in response to extreme environmental conditions. In some embodiments, shutdown of the motor and/or hard disk drive may be avoided by increasing the stiffness or damping of the fluid dynamic bearing by modulating the axial load on the fluid dynamic bearing. For example, if a user goes jogging with a portable music player having a hard disk drive, the motion during jogging will result in the hard disk drive being swung back and forth. Various embodiments are configured to adjust the fluid dynamic bearing to enable continued operation instead of shutting the motor and/or hard disk drive down.

During the operation of the motor, the height that the motor flies in the thrust portion is referred to as fly-height. A higher fly-height has less angular stiffness relative to a lower fly-height which has comparatively more angular stiffness. Thus, reducing the fly-height of the motor increases the angular stiffness thereby allowing the motor to better withstand extreme conditions (e.g., shock event). For example, the reduced fly-height results in reduced distance for components of the motor to travel during a shock and further reduces the shock of secondary impacts. The smaller distances reduce the amount of speed that components (e.g., a motor rotor) can achieve during secondary impacts. Therefore, the reduced fly-height may not prevent contact during an extreme condition, but it reduces the axial acceleration and displacement of rotating motor components. The reduced displacement of the bearing may then help stabilize the position of the hard disk drive heads and reduce the likelihood of the hard disk drive components impacting and bouncing off each other.

Various embodiments may be configured to adjust the axial force, thereby adjusting axial stiffness of the fluid dynamic bearing. In addition, power and dynamics may be modulated to achieve an optimal outcome with respect to power consumption, shock behavior, and off track behavior. Some embodiments may change the flow of motor lubricant, influencing the electromagnetic bias, deforming the fluid dynamic bearing, adjusting a location of a biasing component, and changing stator current. Various embodiments may be configured for use with single and dual thrust motors.

Further, various embodiments may reduce the axial displacement of the rotor (e.g., reduced fly-height thereby shortening the distance for acceleration during a shock event), reduce the angular displacement (e.g., reducing the angular rotation of a rotor during a shock event), and increase angular stiffness (e.g., reducing the response to an external force to cause less movement). Thus various embodiments may reduce the distance for available movement and increase forces (e.g., stiffness) to prevent movement. Various embodiments thereby dynamically increase stiffness to substantially counteract, substantially overcome, or substantially reduce the impact of negative environmental conditions.

In various embodiments, the stiffness of the fluid dynamic bearing may be adjusted by changing the diameter of one of the bearing surfaces (e.g., using a piezo element), applying current through the fluid of the fluid dynamic bearing to change the viscosity, or adding stiffness by using heat to change the geometry of motor parts. Various embodiments may further be applied to motors with one or more thrust bearings, conical motors, and spindle motors but are not limited thereto.

Figure 1:
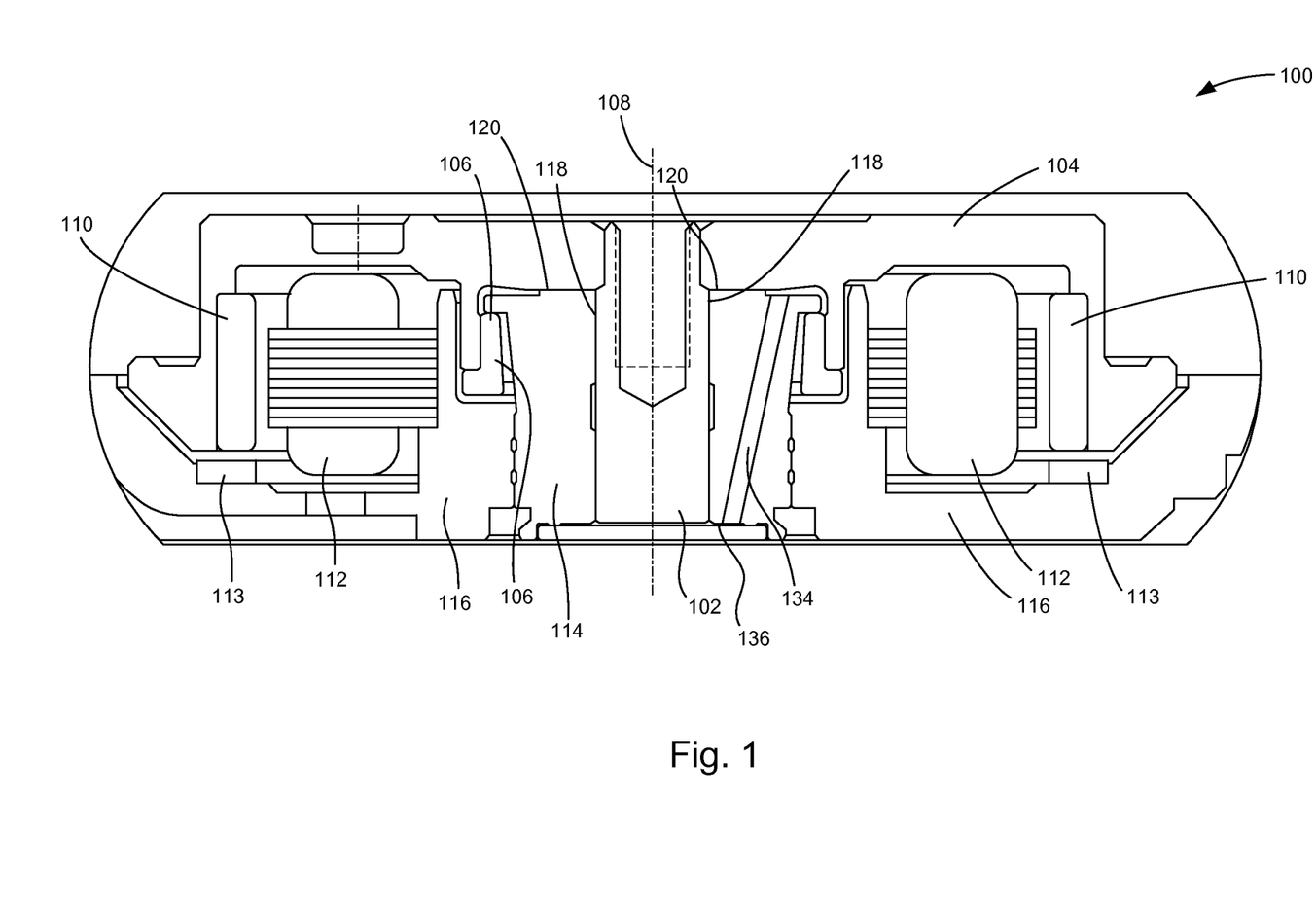
FIG. 1 provides a cross-sectional side view of a spindle motor for a hard disk drive, according to one aspect of the present embodiments.

FIG. 1 provides a cross-sectional side view of a spindle motor for a hard disk drive in accordance with an embodiment. Such a spindle motor 100 may be used in a hard disk drive such as the hard disk drive 700 described in FIG. 7. Furthermore, the spindle motor 100 may include various embodiments described in detail in subsequent figures below for dynamically adjusting a characteristic (e.g. the stiffness or damping) of the motor.

The spindle motor 100 of FIG. 1 includes a stationary component and a rotatable component positioned for relative rotation (e.g., RPM of about 4,800; 5,400; 7,200; 10,000; 15,000, etc.) with respect to each other. The stationary component includes, but is not limited to, components coupled to a base plate 116, such as a stator 112 and a sleeve 114. Components and/or sub-components of the stationary component may also be referred to as stationary components herein, such as a stationary stator 112 and a stationary sleeve 114.

The rotatable component includes, but is not limited to, components such as a shaft 102, a hub 104, a magnet 110 coupled to the hub 104, and a limiter bushing 106 of a limiter bearing, which limiter bushing 106 may be a flanged limiter bushing as shown. Components and/or sub-components of the rotatable component may also be referred to as rotatable components herein, such as a rotatable shaft 102, a rotatable hub 104, a rotatable magnet 110, and a rotatable limiter bushing 106. The hub 104 includes a hub flange, which supports a disk pack for rotation about a central axis 108 of shaft 102. In operation, the magnet 110 coupled to the hub 104 and interacts with the stator 112 to cause the hub 104 and disk pack to rotate. In some embodiments, windings of stator 112 are offset in a downward direction from the center of magnet 110 to create a downward force on magnet 110, thereby magnetically biasing the spindle motor 100.

One or more fluid dynamic bearings (e.g., journal bearing; thrust bearing; etc.) may be defined between the stationary component and the rotatable component. The spindle motor 100 of FIG. 1 includes, for example, a journal bearing 118 defined by the sleeve 114 and the rotating shaft 102. The journal bearing 118 provides radial stiffness to the shaft 102 of the spindle motor 100, restricts radial movement of the shaft in a direction perpendicular to the central axis 108, and substantially prevents tilting of the shaft 102.

The spindle motor 100 of FIG. 1 also includes, for example, a thrust bearing 120 on one of the sleeve 114 or the hub 104. The thrust bearing 120 provides an upward force on the hub 104 to counterbalance downward forces such as the weight of the hub 104, axial forces between the hub 104 and a biasing component 113, and axial forces between the stator 112 and the magnet 110. In various embodiments, described in greater detail below, the biasing component 113, for example, may be dynamically adjustable, thereby allowing automatic tuning of the attraction between the biasing component 113 and the magnet 110, in response to changes in environmental conditions. Thus in various embodiments, the biasing component 113 is configured to modulate the axial load on a fluid dynamic bearing (described below) to dynamically adjust the stiffness or damping of the fluid dynamic bearing.

The spindle motor 100 of FIG. 1 may further include a fluid, fluid medium, or lubricating fluid 136 such as a liquid (e.g., lubricating oil or fluid), a gas, or a combination thereof between the stationary component and the rotatable component. As shown in FIG. 1, a recirculation path 134 extending from an inner radius at a bottom portion of the sleeve 114 to an outer radius at a top portion of the sleeve 114 fluidly connects the one or more fluid dynamic bearings with the lubricating fluid 136 and further supplies the lubricating fluid 136 to these one or more fluid dynamic bearings. Various embodiments may include different configurations of the recirculation path 134. Some non-limiting examples include: extending from outer radius at bottom to inner radius at top, non-angled recirculation paths extending parallel to the axis of rotation, L-shaped recirculation paths, etc.

While embodiments are described with reference to the spindle motor 100, which includes a rotating shaft 102, the embodiments are not limited to rotating shaft motors. For example, other non limiting motor examples may include fixed shaft motors, motors where both the shaft and sleeve rotate, conical motors, dual thrust bearing motors, motors without limiters, etc.

Figure 2A:
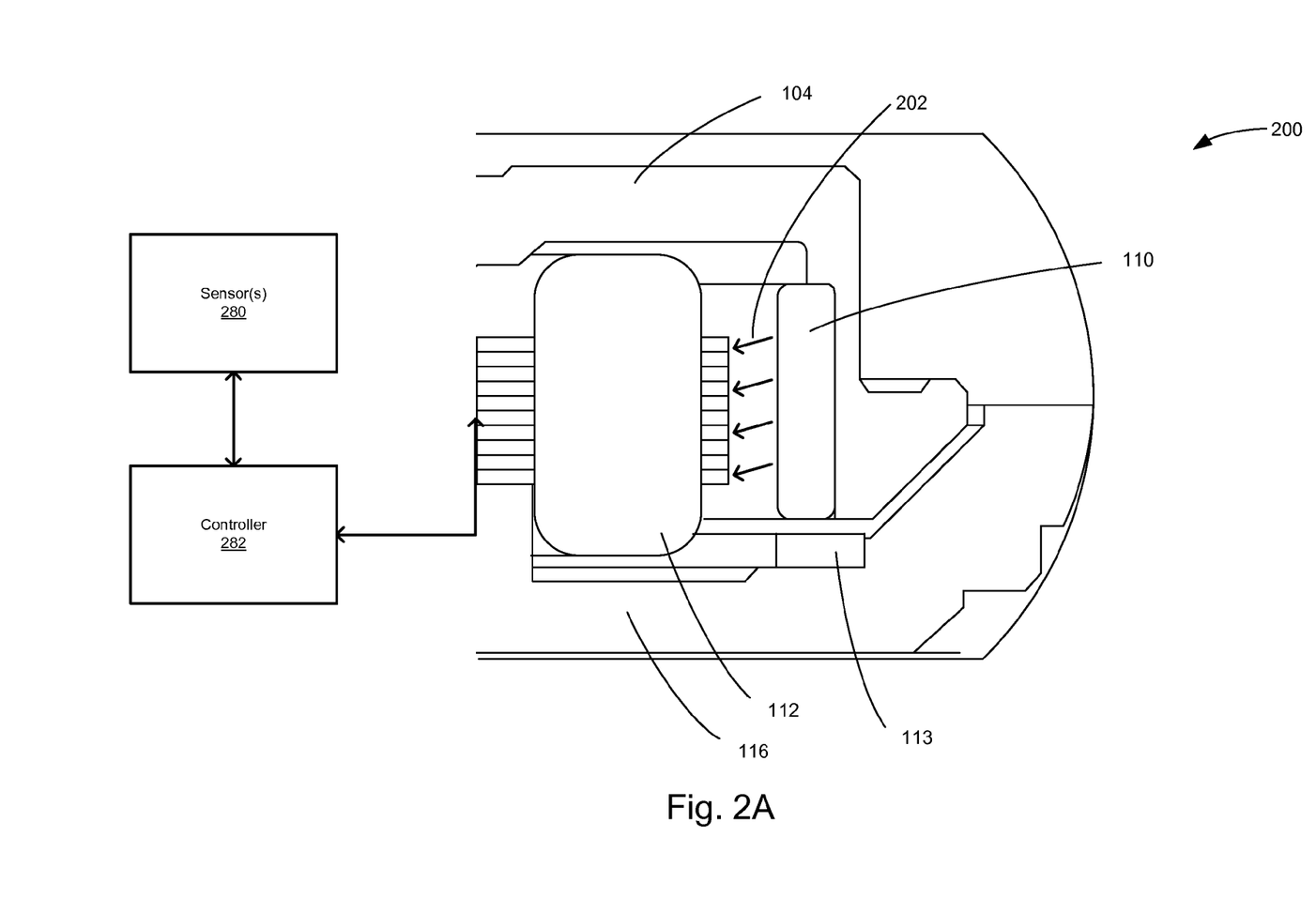
FIG. 2A provides a cross-sectional side view of a portion of a spindle motor configured to increase fluid dynamic bearing stiffness or damping, according to one aspect of the present embodiments.

FIG. 2A provides a cross-sectional side view of a portion of a spindle motor configured to increase fluid dynamic bearing stiffness, according to one aspect of the present embodiments. Elements of spindle motor 200 having the same reference numerals as spindle motor 100 may perform substantially similar functions as described herein with respect to spindle motor 100. Spindle motor 200 includes sensor(s) 280 and controller 282. In some embodiments, sensor(s) 280 and controller 282 may be external to spindle motor 200.

Sensor(s) 280 may include accelerometers, displacements sensors, etc. to detect one or more environmental conditions (e.g., for detecting free fall or shock events) or operational states (e.g., drive state, idle state, read/write states, etc.). One or more sensors may be placed anywhere within the spindle motor 200 that permit detection of environmental conditions and/or operational states. For example, the sensor(s) 208 may be placed on, for example, a disk, the hub 104, and/or the base plate 116. Sensor(s) 280 may further detect temperature, shock, vibration, and gyroscopic movement. In some embodiments, sensor(s) 280 may also detect when the displacement between the head and the disk changes when the disk is moving. Read/write servomechanisms within a hard disk drive may also use data from displacement sensors.

Sensor(s) 280 are coupled to controller 282 and provide data to controller 282. Controller 282 determines the amount of stiffness of a fluid dynamic bearing that needs to be adjusted. In various embodiments, controller 282 may reduce the relative angle between hub 104 and base plate 116 to increase the stiffness of the fluid dynamic bearing. Thus in some embodiments, the controller 282 may be configured to respond to an environmental state or an operational state by transmitting a signal to components of spindle motor 200 to adjust the stiffness of the fluid dynamic bearing, thereby adjusting the axial response of the spindle motor 200.

By dynamically adjusting the stiffness of the fluid dynamic bearing, embodiments described herein avoid contact between various components by dynamically modulating the biasing force between components. For example, during a shock event the rotating component and the stationary component may contact each other. By increasing the stiffness of the fluid dynamic bearing, some or all of the contact between the rotating component and the stationary component may be substantially avoided. Thus by either avoiding some of the contact or avoiding all of the contact, damage caused to the stationary component and/or the rotating component may be reduced.

In some embodiments, controller 282 adjusts the biasing force between stator 112 and magnet 110 to adjust the stiffness of the fluid dynamic bearing. Controller 282 may be configured to adjust the biasing attraction between stator 112 and magnet 110 during operation by changing the current through one or more windings of stator 112 while maintaining rotational speed. For example, controller 282 may determine an adjustment to the current supplied to stator 112 in response to an environmental condition (e.g., shock, vibration, etc.).

FIG. 2A depicts force lines 202 with respect to spindle motor 200 created by stator 112 with respect to magnet 110 by a change (e.g., increase) in the current controlled by controller 282. The force created by stator 112 has three components: a radial component, a tangential or circumferential component, and an axial component. The radial component attracts magnet 110 toward stator 112. The tangential or circumferential component rotates the rotatable component of spindle motor 100. The axial component attracts magnet 110 in a downward motion (e.g., with respect to central axis 108).

In some embodiments, controller 282 is configured to de-tune spindle motor 200 while maintaining the rotational speed of spindle motor 200. The current provided to stator 112 is proportional to the load to be displaced (e.g., hub 104 and magnet 110). The de-tuning of spindle motor 200 may be performed by changing the commutation angle from an optimal position and to maintain speed while more current is provided to stator 112. In some embodiments, the current through stator 112 may be adjusted by detuning the commutation angle of the minor loop or by detuning a phase commutation circuit. The increase in current creates an electromagnetic field that axially attracts magnet 110 with a downward force as depicted by force lines 202. The de-tuning of the motor while maintaining speed thus increases the axial force created by stator 112 thereby increasing the stiffness of the fluid dynamic bearing.

Figure 2B:
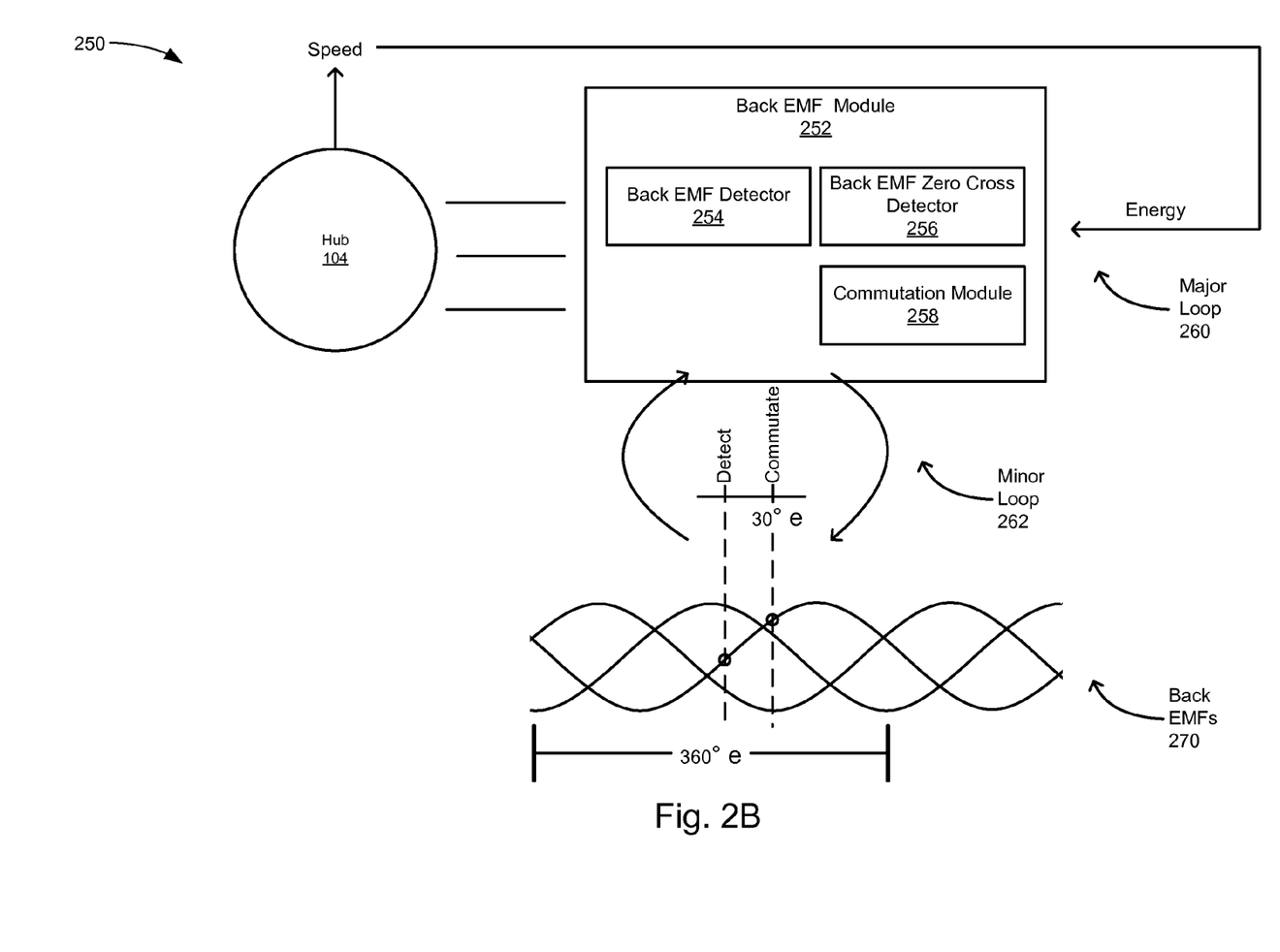
FIG. 2B provides an exemplary block diagram of exemplary components of a controller, according to one aspect of the present embodiments.

FIG. 2B provides an exemplary block diagram of exemplary components of a controller, according to one aspect of the present embodiments. Diagram 250 includes back electromagnetic force (EMF) module 252, major loop 260, minor loop 262, and back EMFs 270. In various embodiments, controller 282 includes back EMF module 252. In some embodiments, back EMF module 252 is external to controller 282.

Back EMF module 252 is configured to monitor the electromagnetic forces of components of spindle motor 200 (e.g., stator 112) and adjust the electromagnetic forces. In some embodiments, back EMF module 252 includes back EMF detector 254, back EMF zero cross detector 256, and commutation module 258. Major loop 260 is configured to control the amount of current applied to the coils of stator 112. Major loop 260 may be configured to measure the speed of hub 104 and increase the energy (e.g., voltage or current) applied to a stator to maintain the speed of hub 104 and the torque applied to hub 104.

Commutation module 258 and minor loop 262 are configured to control the timing of commutation of current from one coil to the next coil (e.g., of stator 112) as a function of the position of a rotor (e.g., hub 104). By adjusting the commutation in minor loop 262 (e.g., to be late or early), more current will be used to maintain the same tangential force while maintaining the same speed. The increase in current in stator 112 thereby creates a larger closing electromagnetic field having the effect of increasing the radial force and the axial force on magnet 110. The magnetic field of stator 112 tends to maximize and the magnetic field maximizes if magnet 110 is aligned with stator 112. Thus an increase in current creates a larger magnetic field, thereby pulling down on magnet 110. This increase of radial force and axial force causes hub 104 to be pulled down (e.g., reduces the gap between hub 104 and base plate 116) which increases the stiffness of the fluid dynamic bearing.

Back EMF detector 254 is configured to detect the electromagnetic forces of windings of a stator (e.g., stator 112). Back EMFs 270 depict detected exemplary electrical signals (e.g., sinusoidal waveforms) of three windings of a stator (e.g., stator 112). Back EMF zero cross detector 256 is configured to detect the moment when a back EMF (e.g., of Back EMFs 270) of a coil of a stator goes through a zero point. Back EMF zero cross detector 256 may be configured to wait a 30° electrical delay to signal commutation module 258 to commutate a signal to a coil of the stator during normal operation. By changing the delay, the commutation timing is changed thereby de-tuning the spindle motor 200. More current is then applied to maintain the rotational speed of hub 104 causing an increase in the axial force on hub 104 thereby increasing the stiffness of the fluid dynamic bearing.

Figure 3:
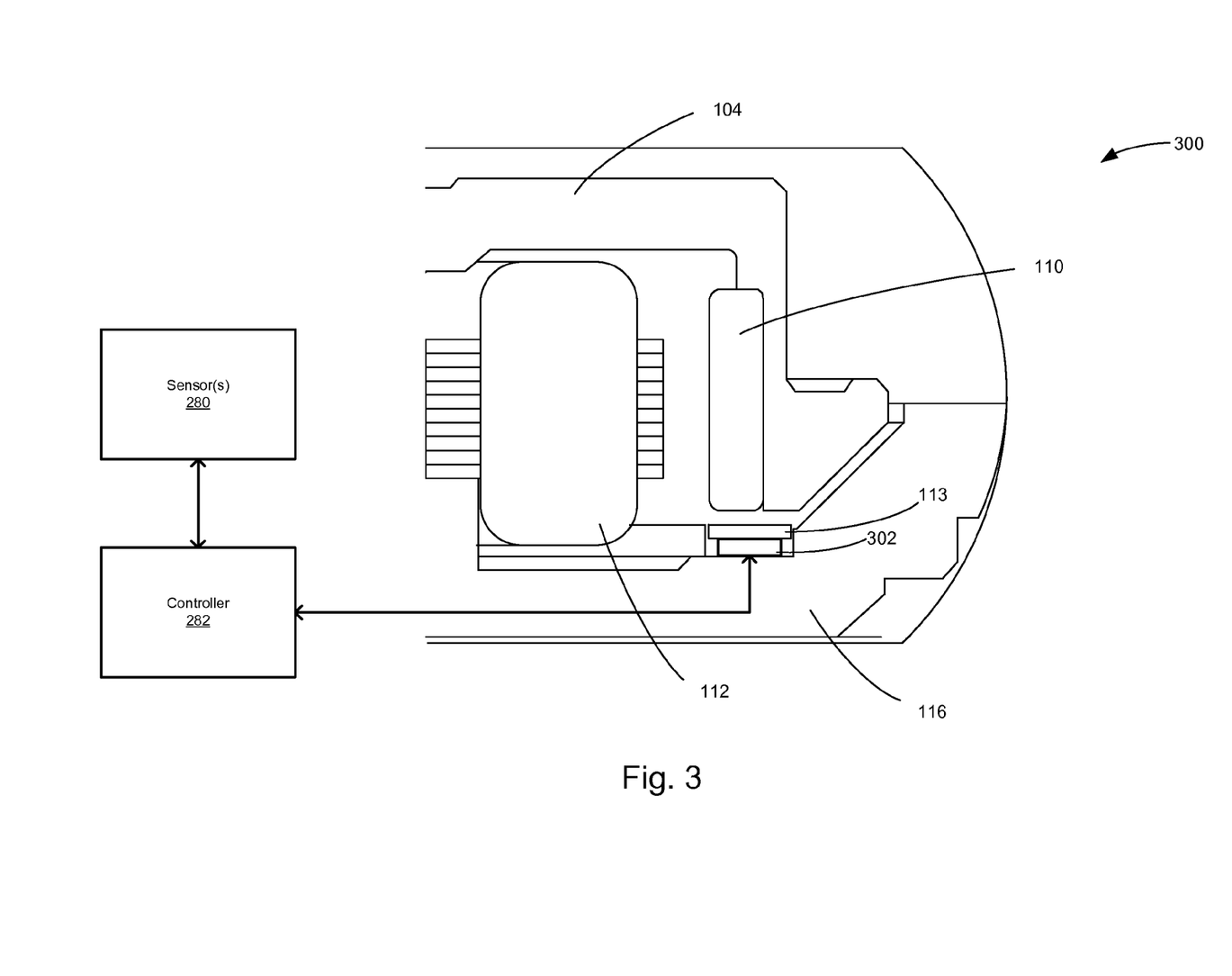
FIG. 3 provides a cross-sectional side view of a portion of a spindle motor configured for mechanical adjustment of a biasing component, according to one aspect of the present embodiments.

FIG. 3 provides a cross-sectional side view of a portion of a spindle motor configured for mechanical adjustment of a biasing component, according to one aspect of the present embodiments. Elements of spindle motor 300 having the same reference numerals as spindle motor 100 may perform substantially similar functions as described herein with respect to spindle motor 100. Spindle motor 300 includes actuator component 302.

Controller 282 is coupled to actuator component 302. Controller 282 is configured to adjust the position of bias component 113 via actuator component 302 (e.g., in response to data received from sensor(s) 280). Actuator component 302 is configured to move (e.g., mechanically up or down) bias component 113 closer to and further away from magnet 110. In various embodiments, actuator component 302 includes a piezo electrical element. In some embodiments, actuator component 302 includes an electromagnetic system (e.g., solenoid) to move bias component 113 up and down. In some embodiments, bias component 113 is annular (e.g. a bias ring).

The movement of bias component 113 toward magnet 110 reduces the gap between magnet 110 and bias ring component 113. The movement or adjustment of the position of bias component 113 closer to magnet 110 creates a stronger attractive force (e.g., downward force) between bias component 113 and magnet 110. The increase in force between bias component 113 and magnet 110 thereby increases the stiffness of the fluid dynamic bearing.

For example, base plate 116 may include aluminum and bias component 113 includes steel. Bias component 113 may thus create an attraction between magnet 110 and bias component 113, which pulls magnet 110 in a downward direction.

Figure 4:
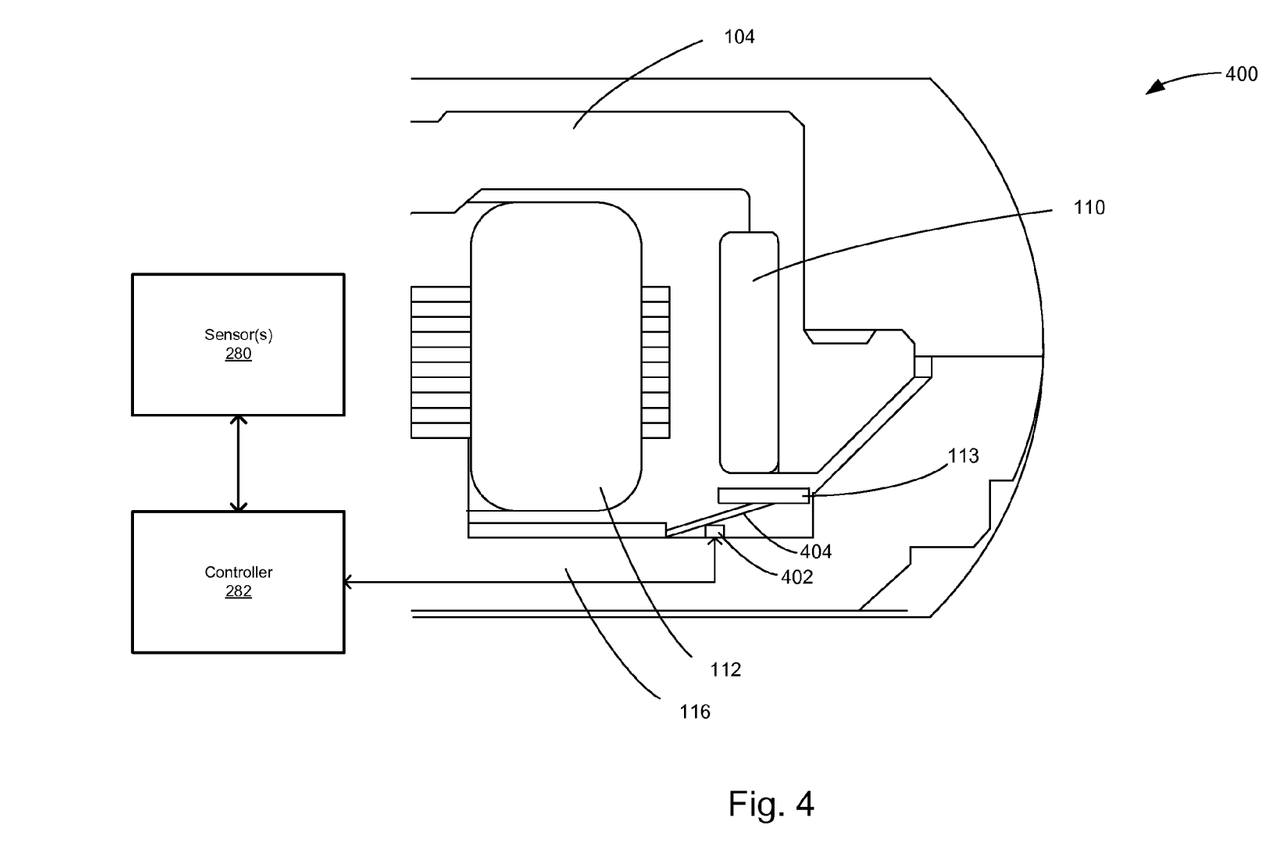
FIG. 4 provides a cross-sectional side view of a portion of another spindle motor configured for mechanical adjustment of a biasing component, according to one aspect of the present embodiments.

FIG. 4 provides a cross-sectional side view of a portion of another spindle motor configured for mechanical adjustment of a biasing component, according to one aspect of the present embodiments. Elements of spindle motor 400 having the same reference numerals as spindle motor 100 may perform substantially similar functions as described herein with respect to spindle motor 100. Spindle motor 400 includes actuator component 402 and lever 404.

Controller 282 is coupled to actuator component 402. Controller 282 is configured to adjust the position of bias component 113 via actuator component 402 and lever 404 (e.g., in response to data received from sensor(s) 280). In various embodiments, actuator component 402 includes a piezo electric component. In some embodiments, lever 404 is connected to base plate 116 (e.g., via a pinion). Lever 404 may include a metal portion. Actuator component 402 is configured to actuate lever 404 to move or adjust the position of bias component 113 relative to magnet 110. In some embodiments, lever 404 is configured to provide mechanical advantage to actuator component 402.

The movement or adjustment of the position of bias component 113 closer to magnet 110 creates increased attractive force (e.g., downward force) between bias component 113 and magnet 110. The increase in force between bias component 113 and magnet 110 thereby increases the stiffness of the fluid dynamic bearing.

Figure 5:
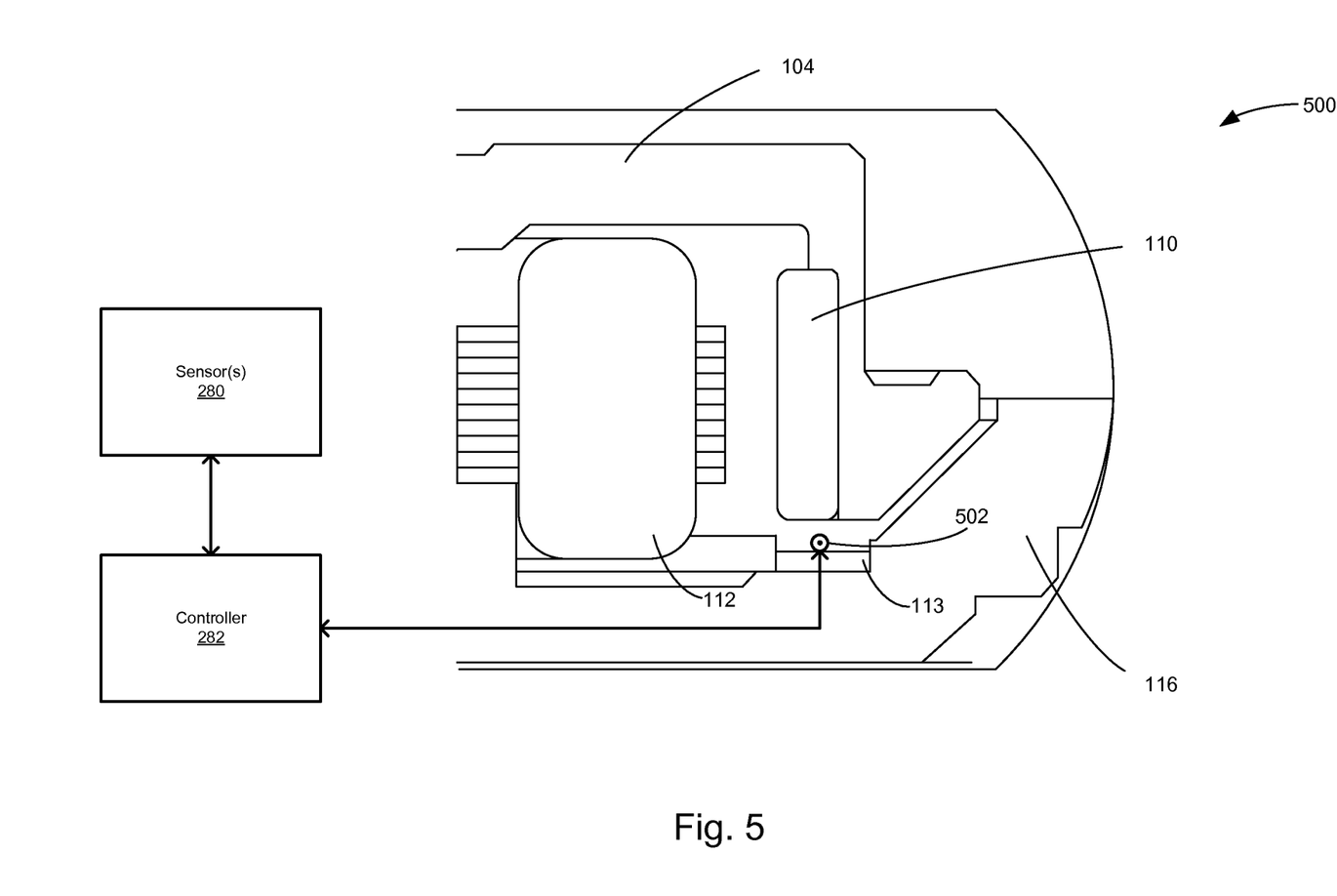
FIG. 5 provides a cross-sectional side view of a portion of a spindle motor including an electromagnetic biasing component, according to one aspect of the present embodiments.

FIG. 5 provides a cross-sectional side view of a portion of a spindle motor including an electromagnetic biasing component, according to one aspect of the present embodiments. Elements of spindle motor 500 having the same reference numerals as spindle motor 100 may perform substantially similar functions as described herein with respect to spindle motor 100. Spindle motor 500 includes electromagnetic biasing component 502. In various embodiments, electromagnetic biasing component 502 is on a top portion of bias component 113. Electromagnetic biasing component 502 may be coupled to bias component 113 via glue or other adhesive material. In some embodiments, bias component 113 includes electromagnetic biasing component 502. Electromagnetic biasing component 502 may include steel and may be a ring, a wire, or a circular winding.

Controller 282 is coupled to electromagnetic biasing component 502. Controller 282 is configured to apply a current to electromagnetic biasing component 502 (e.g., in response to a shock event, other environmental condition, and/or operational state) thereby creating an electromagnetic field which pulls on magnet 110. In various embodiments, controller 282 may not apply a current to electromagnetic biasing component 502 during normal operation but apply a current to electromagnetic biasing component 502 in response to certain environmental conditions (e.g., shock, vibration, etc.). In some embodiments, current applied to electromagnetic bias component 502 creates flux that closes on magnet 110 and hub 104 thereby exerting a downward force on magnet 110 and hub 104. This downward force reduces the gap between magnet 110 and electromagnetic bias component 502 and increases the stiffness or damping of the fluid dynamic bearing. Thus, the electromagnetic bias component 502 is configured to modulate the axial load on the fluid dynamic bearing to dynamically adjust the stiffness or damping of the fluid dynamic bearing, for example, in response to environmental conditions.

Figure 6:
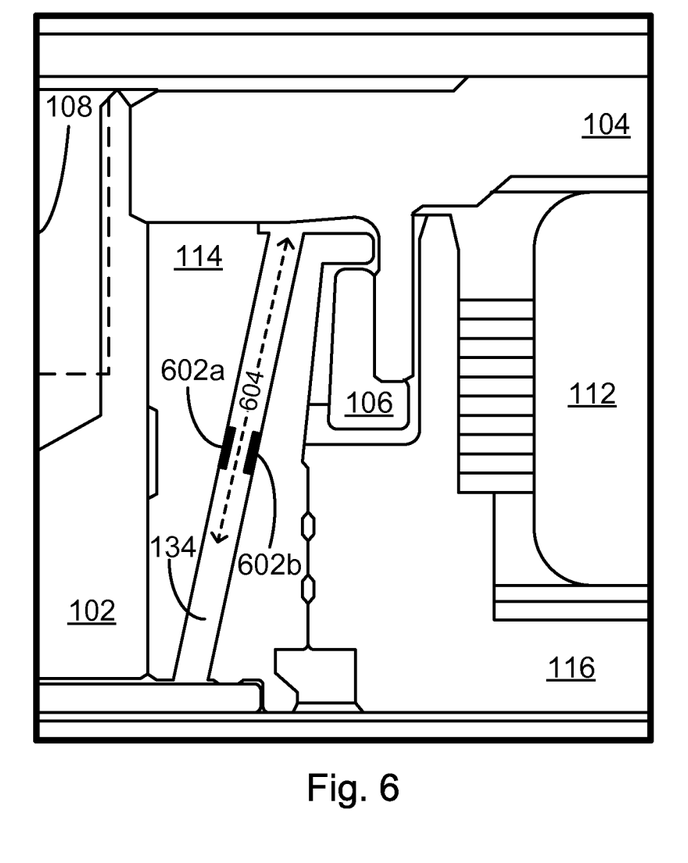
FIG. 6 provides a cross-sectional side view of a portion of a spindle motor including one or more flow adjustment components, according to one aspect of the present embodiments.

FIG. 6 provides a cross-sectional side view of a portion of a spindle motor including one or more flow adjustment components, according to one aspect of the present embodiments. Elements of spindle motor 600 having the same reference numerals as spindle motor 100 may perform substantially similar functions as described herein with respect to spindle motor 100. Spindle motor 600 includes flow adjusters 602a-b. The lubricating fluid of the fluid dynamic bearing flows along recirculation flow path 604.

Controller 282 is coupled to flow adjustors 602a-b. Controller 282 is configured to control flow adjusters 602a-b to increase/decrease hydraulic pressure on recirculation path 604 (e.g., in response to a shock event, other environmental condition, and/or operational state) thereby adjusting the hydraulic pressure. Flow adjusters 602a-b may include a piezoelectric element (e.g., which closes in response to application of electrical current) or a mechanical valve (e.g., microvalve). In some embodiments, the piezo element is an active element whereas the valve is a passive element.

In various embodiments flow adjusters 602a-b are configured to restrict the flow of the lubricating fluid (e.g., oil) of the fluid dynamic bearing. The restriction of the flow of the fluid (e.g., oil) of the fluid dynamic bearing increases the hydraulic pressure, thereby increasing the fly-height of hub 104. On the other hand, removing the restriction and freeing up the flow of the fluid decreases the hydraulic pressure, thereby decreasing the fly-height of the hub 104 and increasing the stiffness of the fluid dynamic bearing.

Flow adjusters 602a-b may thus be configured to increase the fly-height of hub 104 during normal operating conditions. Upon a change in conditions, e.g., as determined by controller 282, flow adjusters 602a-b may be configured to decrease the fly-height of hub 104 by decreasing the hydraulic pressure and thereby increasing the stiffness of the fluid dynamic bearing. In various embodiments, an electromagnetic bias component (e.g., electromagnetic bias component 502) may be used to apply a downward force to magnet 110 in conjunction with flow adjusters 602a-b decreasing the fly-height thereby increasing the stiffness of the fluid dynamic bearing.

In some embodiments, controller 282 may use the flow adjusters 602a-b to adjust the hydraulic pressure to stabilize (e.g., via lessening or damping motion of) one or more spindle motor components in response to an environmental condition (e.g., a shock, impact, vibration, etc.). For example, the hydraulic pressure may be adjusted by flow adjusters 602a-b to decelerate a downward motion of hub 104 in response to a shock event.

Figure 7:
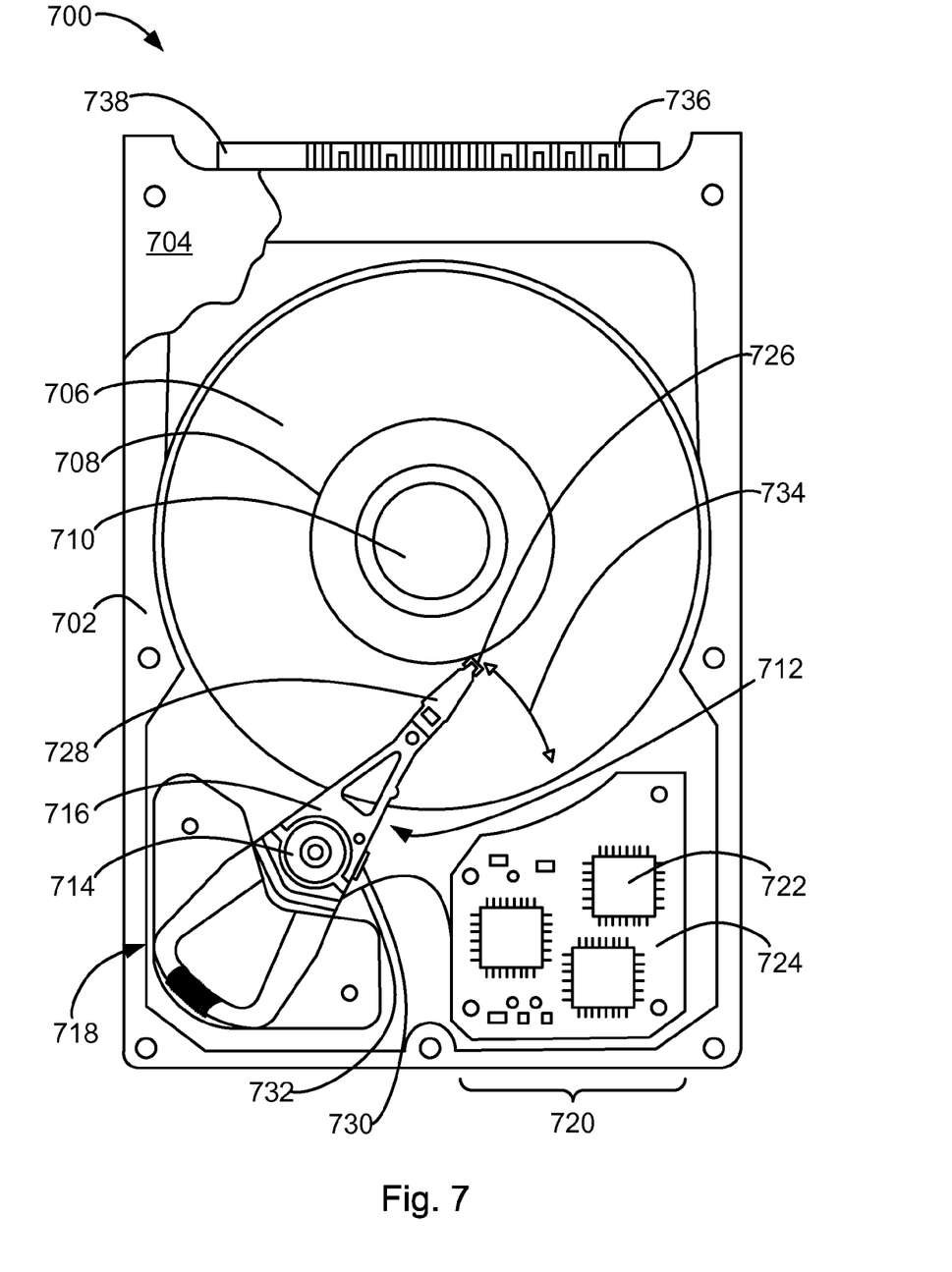
FIG. 7 provides a plan view of a hard disk drive, according to one aspect of the present embodiments.

FIG. 7 provides a plan view of a hard disk drive 700, according to one aspect of the present embodiments. Hard disk drive 700 may include a housing assembly including a cover 702 that mates with a base deck having a frame 703 and a floor or base 704, which housing assembly provides a protective space for various hard disk drive components. The hard disk drive 700 includes one or more data storage disks 706 of computer-readable data storage media. Typically, both of the major surfaces of each data storage disk 706 include a number of concentrically disposed tracks for data storage purposes. Each data storage disk 706 is mounted on a hub 708, which in turn is rotatably interconnected with the base deck and/or cover 702. The hub 708 may have been electrochemically machined (as described above). Multiple data storage disks 706 are typically mounted in vertically spaced and parallel relation on the hub 708. A spindle motor assembly 710 rotates the data storage disks 706. As described above, the spindle motor assembly 710 may include one or more embodiments configured to dynamically adjust fluid dynamic bearing stiffness.

The hard disk drive 700 also includes an actuator arm assembly 712 that pivots about a pivot bearing 714, which in turn is rotatably supported by the base deck and/or cover 702. The actuator arm assembly 712 includes one or more individual rigid actuator arms 716 that extend out from near the pivot bearing 714. Multiple actuator arms 716 are typically disposed in vertically spaced relation, with one actuator arm 716 being provided for each major data storage surface of each data storage disk 706 of the hard disk drive 700. Other types of actuator arm assembly configurations could be utilized as well, an example being an "E" block having one or more rigid actuator arm tips, or the like, that cantilever from a common structure. Movement of the actuator arm assembly 712 is provided by an actuator arm drive assembly, such as a voice coil motor 718 or the like. The voice coil motor 718 is a magnetic assembly that controls the operation of the actuator arm assembly 712 under the direction of control electronics 720. The control electronics or print circuit board assembly (PCBa) 720 may include a number of integrated circuits 722 coupled to a printed circuit board (PCB) 724. The control electronics 720 may be coupled to the voice coil motor assembly 718, a slider 726, or the spindle motor assembly 710 using interconnects that can include pins, cables, or wires (not shown).

A load beam or suspension 728 is attached to the free end of each actuator arm 716 and cantilevers therefrom. Typically, the suspension 728 is biased generally toward its corresponding data storage disk 706 by a spring-like force. The slider 726 is disposed at or near the free end of each suspension 728. What is commonly referred to as the read-write head (e.g., transducer) is appropriately mounted as a head unit (not shown) under the slider 726 and is used in hard disk drive read/write operations. The head unit under the slider 726 may utilize various types of read sensor technologies such as anisotropic magnetoresistive (AMR), giant magnetoresistive (GMR), tunneling magnetoresistive (TuMR), other magnetoresistive technologies, or other suitable technologies.

The head unit under the slider 726 is connected to a preamplifier 730, which is interconnected with the control electronics 720 of the hard disk drive 700 by a flex cable 732 that is typically mounted on the actuator arm assembly 712. Signals are exchanged between the head unit and its corresponding data storage disk 706 for hard disk drive read/write operations. In this regard, the voice coil motor 718 is utilized to pivot the actuator arm assembly 712 to simultaneously move the slider 726 along a path 734 and across the corresponding data storage disk 706 to position the head unit at the appropriate position on the data storage disk 706 for hard disk drive read/write operations.

When the hard disk drive 700 is not in operation, the actuator arm assembly 712 is pivoted to a "parked position" to dispose each slider 726 generally at or beyond a perimeter of its corresponding data storage disk 706, but in any case in vertically spaced relation to its corresponding data storage disk 706. In this regard, the hard disk drive 700 includes a ramp assembly (not shown) that is disposed beyond a perimeter of the data storage disk 706 to both move the corresponding slider 726 vertically away from its corresponding data storage disk 706 and to also exert somewhat of a retaining force on the actuator arm assembly 712.

Exposed contacts 736 of a drive connector 738 along a side end of the hard disk drive 700 may be used to provide connectivity between circuitry of the hard disk drive 700 and a next level of integration such as an interposer, a circuit board, a cable connector, or an electronic assembly. The drive connector 738 may include jumpers (not shown) or switches (not shown) that may be used to configure the hard disk drive 700 for user specific features or configurations. The jumpers or switches may be recessed and exposed from within the drive connector 738.

Frame 703 may be configured to provide stiffness around the perimeter of hard disk drive 700. The pivot rotational axis may be tied to or between cover 702 and base 704. As a result, spans between the pivot attach area and frame 703 may experience increased deflection during vibration or shock of hard disk drive 700 (e.g., during the operation of hard disk drive 700). Embodiments are configured to locate and connect components into such spans thereby increasing stiffness and damping thereby reducing the undesirable effects of vibration and shock.

As such, provided herein is an apparatus, including a stationary component and a rotatable component configured for rotation relative to the stationary component. The apparatus further includes a fluid dynamic bearing defined by the stationary component and the rotatable component and a device configured to dynamically adjust a characteristic (e.g. the stiffness or damping) of the fluid dynamic bearing. In various embodiments, the device further includes means for dynamically adjusting the stiffness in response to an environmental condition and/or an operational state. The apparatus may further include a sensor configured to detect an environmental condition and/or an operational state and a controller communicatively coupled to the sensor and configured to receive information from the sensor to dynamically adjust the stiffness of the fluid dynamic bearing in response to the environmental condition and/or the operational state. In various embodiments, the device further includes a displacement sensor configured to dynamically adjust the stiffness of the fluid dynamic bearing by detecting movement of a disk in response to an environmental condition.

In various embodiments, the device may further include an electromagnetic biasing ring configured to operably generate a force between the rotatable component and the stationary component to dynamically adjust the stiffness of the fluid dynamic bearing. The device may further include a piezo component configured to adjust the gap in the fluid dynamic bearing. In some embodiments, the device further includes an electromagnetic biasing ring, where the piezo component is coupled to the electromagnetic biasing ring to dynamically adjust the stiffness of the fluid dynamic bearing. In various embodiments, the device may further include an electromagnetic biasing ring operably connected to the stationary component, a piezo component, and a lever coupled to the electromagnetic biasing ring and piezo component. The lever may be configured to move the electromagnetic biasing ring in response to the piezo component to dynamically adjust the stiffness of the fluid dynamic bearing. In some embodiments, the device may further include a flow adjuster configured to modulate a recirculation path between the stationary and rotatable components to dynamically adjust the stiffness.

The device may further include means for modulating the fly-height of the rotatable component in an axial direction to dynamically adjust the stiffness of the fluid dynamic bearing. In various embodiments, the device further includes a means for generating a biasing force between the stationary component and rotatable component in response to modulating current through the stationary component during rotation of the rotatable component. In some embodiments, the device may further include a means for maintaining rotational speed of the rotatable component in response to de-tuning a commutation angle and/or a phase commutation circuit communicatively coupled the means for maintaining rotational speed of the rotatable component.

Also provided herein is an apparatus, including a fluid dynamic bearing and means for dynamically adjusting a characteristic (e.g. the stiffness or damping) of the fluid dynamic bearing. The means for dynamically adjusting the stiffness of the fluid dynamic bearing may further include a sensor configured to detect an environmental condition or operational state and a controller communicatively coupled to the sensor and configured to receive information from the sensor to dynamically adjust the stiffness of the fluid dynamic bearing in response to the environmental condition or operational state. In various embodiments, the means for dynamically adjusting the stiffness of the fluid dynamic bearing further includes a displacement sensor to detect movement of a disk in response to an environmental condition to dynamically adjust the stiffness of the fluid dynamic bearing.

In various embodiments, the means for dynamically adjusting the stiffness of the fluid dynamic bearing further includes an electromagnetic biasing ring configured to operably generate a force between rotatable and stationary components. In some embodiments, the means for dynamically adjusting the stiffness of the fluid dynamic bearing further includes a piezo component configured to adjust the gap in the fluid dynamic bearing. In various embodiments, the means for dynamically adjusting the stiffness of the fluid dynamic bearing further includes an electromagnetic biasing ring, where the piezo component is coupled to the electromagnetic biasing ring. In some embodiments, the means for dynamically adjusting the stiffness of the fluid dynamic bearing further includes an electromagnetic biasing ring, a piezo component and a lever coupled to the electromagnetic biasing ring and piezo component to move the electromagnetic biasing ring in response to the piezo component to dynamically adjust the stiffness of the fluid dynamic bearing.

In various embodiments, the means for dynamically adjusting the stiffness of the fluid dynamic bearing further includes a flow adjuster to modulate a recirculation path between a stationary component and a rotatable component to dynamically adjust the stiffness of the fluid dynamic bearing.

In some embodiments, the means for dynamically adjusting the stiffness of the fluid dynamic bearing further includes means for modulating the fly-height of a rotatable component in an axial direction to dynamically adjust the stiffness of the fluid dynamic bearing. In various embodiments, the means for dynamically adjusting the stiffness of the fluid dynamic bearing further includes means for generating a biasing force between a stationary component and a rotatable component in response to modulating current through the stationary component during rotation of the rotatable component. In some embodiments, the means for dynamically adjusting the stiffness of the fluid dynamic bearing further includes means for maintaining rotational speed of the rotatable component in response to de-tuning a commutation angle and/or a phase commutation circuit coupled a stationary component.

Also provided herein is an apparatus, including a first component and a second component. The second component is suspended relative to, and contact-free from, the first component by a fluid dynamic bearing. The apparatus further includes means for reducing axial displacement of the second component relative to the first component. The means for reducing axial displacement avoids contact between the first component and the second component by dynamically modulating a force between the first component and the second component. In various embodiments, the means for reducing axial displacement of the second component includes means for dynamically adjusting a characteristic (e.g. the stiffness or damping) of the fluid dynamic bearing in response to an environmental condition and/or an operational state. In some embodiments, the means for reducing axial displacement of the second component includes means for adjusting a gap between the first component and second component. In various embodiments, the means for reducing axial displacement of the second component includes means for adjusting the fly-height of the second component in an axial direction to dynamically adjust a characteristic (e.g. the stiffness or damping) of the fluid dynamic bearing. In some embodiments, the apparatus further includes means for sensing an environmental condition and/or an operational state and means for signaling the means for reducing axial displacement of the second component in response to the environmental condition and/or the operational state.

In various embodiments, the means for reducing axial displacement of the second component includes means for maintaining rotational speed of the second component in response to de-tuning a commutation angle and/or a phase commutation circuit coupled the first component. In some embodiments, the means for reducing axial displacement of the second component includes an electromagnetic biasing ring.

In various embodiments, the means for reducing axial displacement of the second component includes an actuator component. The actuator component may include a piezo component and an electromagnetic biasing ring, where the piezo component is coupled to the electromagnetic biasing ring. The piezo component may be configured to adjust a position of the electromagnetic biasing ring. In some embodiments, the means for reducing axial displacement of the second component further includes an electromagnetic biasing ring and a lever coupled to the actuator component and the electromagnetic biasing ring. In various embodiments, the means for reducing axial displacement of the second component includes means for adjusting a flow of a fluid of the fluid dynamic bearing.

While embodiments have been described and/or illustrated by means of examples, and while these embodiments and/or examples have been described in considerable detail, it is not the intention of the applicant(s) to restrict or in any way limit the scope of the embodiments to such detail. Additional adaptations and/or modifications of the embodiments may readily appear in light of the described embodiments, and, in its broader aspects, the embodiments may encompass these adaptations and/or modifications. Accordingly, departures may be made from the foregoing embodiments and/or examples without departing from the scope of the embodiments. The implementations described above and other implementations are within the scope of the following claims.

What is claimed is:

1. An apparatus comprising:
a stationary component;
a rotatable component configured for rotation relative to the stationary component;
a fluid dynamic bearing defined by the stationary component and the rotatable component; and
a device configured to dynamically adjust the stiffness or damping of the fluid dynamic bearing, wherein the device further comprises means for dynamically adjusting the stiffness or damping in response to an environmental condition or an operational state.

2. The apparatus of claim 1, wherein the device is further configured to modulate the axial load on the fluid dynamic bearing to dynamically adjust the stiffness or damping of the fluid dynamic bearing.

3. The apparatus of claim 1, wherein the device further comprises an electromagnetic biasing ring configured to operably generate a force between the rotatable component and the stationary component to dynamically adjust the stiffness or damping of the fluid dynamic bearing.

4. The apparatus of claim 1, wherein the device further comprises a piezo component configured to adjust the gap in the fluid dynamic bearing.

5. The apparatus of claim 4, wherein the device further comprises a bias component, wherein the piezo component is coupled to the bias component to dynamically adjust the stiffness or damping of the fluid dynamic bearing.

6. The apparatus of claim 1, wherein the device further comprises:
a bias component operably coupled to the stationary component;
a piezo component; and
a lever coupled to the bias component and piezo component, and configured to move the bias component in response to the piezo component to dynamically adjust the stiffness or damping of the fluid dynamic bearing.

7. The apparatus of claim 1, wherein the device further comprises a displacement sensor configured to dynamically adjust the stiffness or damping of the fluid dynamic bearing by detecting movement of a disk in response to an environmental condition.

8. The apparatus of claim 1, wherein the device further comprises a flow adjuster configured to modulate a recirculation path between the stationary and rotatable components to dynamically adjust the stiffness or damping.

9. The apparatus of claim 1, wherein the device further comprises:
a sensor configured to detect an environmental condition or an operational state; and
a controller communicatively coupled to the sensor and configured to receive information from the sensor to dynamically adjust the stiffness or damping of the fluid dynamic bearing in response to the environmental condition or the operational state.

10. The apparatus of claim 1, wherein the device is further configured to generate a biasing force between the stationary component and rotatable component in response to modulating current through the stationary component during rotation of the rotatable component.

11. The apparatus of claim 1, wherein the device is further configured to maintain rotational speed of the rotatable component in response to de-tuning a commutation angle or a phase commutation circuit.

12. An apparatus comprising:
a fluid dynamic bearing; and
means for dynamically adjusting a characteristic of the fluid dynamic bearing.

13. The apparatus of claim 12, wherein the means for dynamically adjusting the characteristic of the fluid dynamic bearing further comprises:
a sensor configured to detect an environmental condition or operational state; and
a controller communicatively coupled to the sensor and configured to receive information from the sensor to dynamically adjust the characteristic of the fluid dynamic bearing in response to the environmental condition or operational state.

14. The apparatus of claim 12, wherein the means for dynamically adjusting the characteristic of the fluid dynamic bearing further comprises an electromagnetic biasing ring configured to operably generate a force between rotatable and stationary components.

15. The apparatus of claim 12, wherein the means for dynamically adjusting the characteristic of the fluid dynamic bearing further comprises a piezo component configured to adjust a gap in the fluid dynamic bearing.

16. The apparatus of claim 15, wherein the means for dynamically adjusting the characteristic of the fluid dynamic bearing further comprises a bias component, wherein the piezo component is coupled to the bias component.

17. The apparatus of claim 12, wherein the means for dynamically adjusting the characteristic of the fluid dynamic bearing further comprises:
a bias component;
a piezo component; and
a lever coupled to the bias component and piezo component to move the bias component in response to the piezo component to dynamically adjust the characteristic of the fluid dynamic bearing.

18. The apparatus of claim 12, wherein the means for dynamically adjusting the characteristic of the fluid dynamic bearing further comprises a displacement sensor to detect movement of a disk in response to an environmental condition to dynamically adjust the characteristic of the fluid dynamic bearing.

19. The apparatus of claim 12, wherein the means for dynamically adjusting the characteristic of the fluid dynamic bearing further comprises a flow adjuster to modulate a recirculation path between a stationary component and a rotatable component to dynamically adjust the characteristic of the fluid dynamic bearing.

20. The apparatus of claim 12, wherein the means for dynamically adjusting the characteristic of the fluid dynamic bearing further comprises means for modulating the fly-height of a rotatable component in an axial direction to dynamically adjust the characteristic of the fluid dynamic bearing.

21. The apparatus of claim 12, wherein the means for dynamically adjusting the characteristic of the fluid dynamic bearing further comprises means for generating a biasing force between a stationary component and a rotatable component in response to modulating current through the stationary component during rotation of the rotatable component.

22. The apparatus of claim 12, wherein the means for dynamically adjusting the characteristic of the fluid dynamic bearing further comprises means for maintaining rotational speed of the rotatable component in response to de-tuning a commutation angle or a phase commutation circuit coupled to a stationary component.

23. An apparatus comprising:
a first component and a second component, wherein the second component is suspended relative to, and contact-free from, the first component by a fluid dynamic bearing; and
means for reducing axial displacement of the second component relative to the first component, wherein the means for reducing axial displacement avoids contact between the first component and the second component by dynamically modulating a force between the first component and the second component.

24. The apparatus of claim 23, wherein the means for reducing axial displacement of the second component comprises means for dynamically adjusting the stiffness or damping of the fluid dynamic bearing in response to an environmental condition or an operational state.

25. The apparatus of claim 23, wherein the means for reducing axial displacement of the second component comprises means for adjusting a gap between the first component and second component.

26. The apparatus of claim 23, wherein the means for reducing axial displacement of the second component comprises means for adjusting the fly-height of the second component in an axial direction to dynamically adjust the stiffness or damping of the fluid dynamic bearing.

27. The apparatus of claim 23, further comprising means for sensing an environmental condition or an operational state and means for signaling the means for reducing axial displacement of the second component in response to the environmental condition or the operational state.

28. The apparatus of claim 23, wherein the means for reducing axial displacement of the second component comprises means for maintaining rotational speed of the second component in response to de-tuning a commutation angle or a phase commutation circuit coupled the first component.

29. The apparatus of claim 23, wherein the means for reducing axial displacement of the second component comprises an electromagnetic biasing ring.

30. The apparatus of claim 23, wherein the means for reducing axial displacement of the second component comprises an actuator component.

31. The apparatus of claim 30, wherein the means for reducing axial displacement of the actuator component comprises a piezo component and a bias component, wherein the piezo component is coupled to the bias component.

32. The apparatus of claim 31, wherein the piezo component is configured to adjust a position of the bias component.

33. The apparatus of claim 30, wherein the means for reducing axial displacement of the second component further comprises a bias component and a lever coupled to the actuator component and the bias component.

34. The apparatus of claim 23, wherein the means for reducing axial displacement of the second component comprises means for adjusting a flow of a fluid of the fluid dynamic bearing.

35. An apparatus comprising:
a stationary component;
a rotatable component configured for rotation relative to the stationary component;
a fluid dynamic bearing defined by the stationary component and the rotatable component; and
a device configured to dynamically adjust the stiffness or damping of the fluid dynamic bearing, wherein the device is further configured to modulate the axial load on the fluid dynamic bearing to dynamically adjust the stiffness or damping of the fluid dynamic bearing.

36. The apparatus of claim 35, wherein the device further comprises an electromagnetic biasing ring configured to operably generate a force between the rotatable component and the stationary component to dynamically adjust the stiffness or damping of the fluid dynamic bearing.

* * * * *